United States Patent
Lodi et al.

(10) Patent No.: US 10,695,864 B2
(45) Date of Patent: Jun. 30, 2020

(54) APPARATUS AND METHOD FOR MANUFACTURING DISCRETE PORTIONS

(71) Applicant: CARTES S.R.L., Moglia (IT)

(72) Inventors: Mario Lodi, Carpi (IT); Carlo Stefano Lodi, Carpi (IT)

(73) Assignee: CARTES S.R.L., Moglia (IT)

( * ) Notice: Subject to any disclaimer, the term of this patent is extended or adjusted under 35 U.S.C. 154(b) by 240 days.

(21) Appl. No.: 15/277,369

(22) Filed: Sep. 27, 2016

(65) Prior Publication Data

US 2017/0087665 A1 Mar. 30, 2017

(30) Foreign Application Priority Data

Sep. 28, 2015 (IT) .................. 102015000055723

(51) Int. Cl.

| | |
|---|---|
| *B23K 26/08* | (2014.01) |
| *B31D 1/02* | (2006.01) |
| *B23K 26/082* | (2014.01) |
| *B23K 26/70* | (2014.01) |
| *B23K 26/38* | (2014.01) |
| *B23K 26/402* | (2014.01) |
| *B23K 37/04* | (2006.01) |
| *B23K 103/16* | (2006.01) |
| *B23K 103/00* | (2006.01) |

(52) U.S. Cl.
CPC ........ *B23K 26/0846* (2013.01); *B23K 26/082* (2015.10); *B23K 26/38* (2013.01); *B23K 26/402* (2013.01); *B23K 26/702* (2015.10); *B23K 37/0408* (2013.01); *B31D 1/021* (2013.01); *B31D 1/026* (2013.01); *B23K 2103/172* (2018.08); *B23K 2103/50* (2018.08); *B31D 2201/02* (2013.01)

(58) Field of Classification Search
CPC .......................... B23K 26/082; B23K 26/0846
See application file for complete search history.

(56) References Cited

U.S. PATENT DOCUMENTS

| | | | | |
|---|---|---|---|---|
| 3,574,026 A | * | 4/1971 | Kucheck ............... | B31D 1/021 156/152 |
| 3,679,300 A | * | 7/1972 | Artelt, Jr. ............... | G03G 15/30 399/384 |
| 5,421,933 A | | 6/1995 | Nedblake et al. | |

(Continued)

FOREIGN PATENT DOCUMENTS

| | | |
|---|---|---|
| WO | 94/14605 A1 | 7/1994 |
| WO | 98/28192 A1 | 7/1998 |

(Continued)

*Primary Examiner* — Leith S Shafi
*Assistant Examiner* — Nicholas R Krasnow
(74) *Attorney, Agent, or Firm* — Pearne & Gordon LLP

(57) ABSTRACT

An apparatus for manufacturing discrete portions (19; 119) comprises:
  an advancement device for advancing a flexible material (4; 102) along a path (P1);
  a cutting device (18) positioned along said path (P1) for cutting the flexible material (4; 102) so as to obtain a discrete portion (19; 119), the cutting device (18) comprising a laser source (20) configured to emit a laser beam (21) incident on a rear face (7; 107), opposite a printed front face (5; 105), of the flexible material (4; 102);
  a retaining device (22) for retaining the flexible material (4; 102) while the cutting device (18) cuts the discrete portion (19; 119) from the flexible material (4; 102).

14 Claims, 4 Drawing Sheets

(56) References Cited

U.S. PATENT DOCUMENTS

| | | | |
|---|---|---|---|
| 5,487,807 A | | 1/1996 | Nedblake et al. |
| 5,624,520 A | * | 4/1997 | Nedblake .................. G09F 3/10 |
| | | | 156/249 |
| 6,095,218 A | | 8/2000 | Delmolino et al. |
| 6,234,053 B1 | | 5/2001 | Olsen et al. |
| 6,592,693 B1 | * | 7/2003 | Nedblake ........... B23K 26/0846 |
| | | | 156/247 |
| 7,556,708 B2 | * | 7/2009 | Phillips .................. B31D 1/021 |
| | | | 156/250 |
| 7,946,906 B2 | * | 5/2011 | Gifford ................ B23D 59/003 |
| | | | 125/13.01 |

FOREIGN PATENT DOCUMENTS

| | | |
|---|---|---|
| WO | 99/03737 A1 | 1/1999 |
| WO | 02/14069 A1 | 2/2002 |

* cited by examiner

APPARATUS AND METHOD FOR MANUFACTURING DISCRETE PORTIONS

The invention relates to an apparatus and method for manufacturing discrete portions, particularly labels, which can be used for packaging products of various kinds, particularly but not exclusively in the food or cosmetic sector. The labels manufactured using the apparatus and method according to the invention may be, for example, self-adhesive labels comprising a support to which a self-adhesive layer is coupled, or single-layer non-self-adhesive labels, particularly made starting from a polymeric film.

It is known that labels are manufactured starting from a continuous ribbon of material, using machine equipped with a print module configured to print, onto a face of the continuous ribbon, graphics that may comprise one or more inscriptions accompanied by a decorative pattern. The continuous ribbon of material may have a multilayer structure, or may be provided with a support structure, made for example of silicone-coated paper, to which a self-adhesive layer adheres removably. The printed face delimits the self-adhesive layer on the opposite side to the support layer.

Alternatively, the continuous ribbon of material may have a single-layer structure, namely may comprise a single layer, for example, made of polymeric material, equipped with a printed face opposite an unprinted face.

Known machines comprise, upstream of the print module, a cutting module which enables each label to be cut along a predefined outline, so that the label can be subsequently applied to the item that it is intended to label. The cutting module may be provided to cut the whole thickness of the continuous ribbon of material from which the labels are formed, so as to obtain a plurality of discrete labels, separate from one another.

Alternatively, in the case of self-adhesive labels, the cutting module may be predisposed only to incise the thickness of the self-adhesive layer, without affecting the support layer. In this way a continuous ribbon is obtained, defined by the support layer, to which the individual self-adhesive labels adhere, each of which has already been cut along the corresponding outline. Between one label and another a scrap material extends, which can be removed by detaching it from the support layer at the exit from the machine manufacturing the labels.

The cutting module may comprise a laser source, intended to emit a laser beam which, through a system of mirrors, is moved along the perimeter of the label, in order to determine its cutting. The laser source is positioned so that the laser beam is directed onto the printed face of the material in ribbon form from which the label is intended to be separated.

In known machines, there is a risk of the laser beam incising the surface of the support layer in contact with the self-adhesive layer, for example in the event that the laser source, as frequently happens, has any power fluctuations. The surface of the support layer in contact with the self-adhesive layer is usually silicone-coated, or oiled, or however treated in such a way that the self-adhesive layer can be detached from that surface relatively easily. In the event that the laser beam incises the support layer, the surface treatment that the layer has undergone is damaged.

Consequently, the adhesive substance with which the self-adhesive layer is covered can penetrate into the thickness of the support layer, which is usually made of paper material. This creates notable difficulties when the label is to be detached from the support layer, on machines that apply the label to items to be labelled.

A further defect that known machines for manufacturing labels sometimes have, is connected with the fact that, when the laser beam hits the printed surface of the label, the inks applied on such surface can sublime. If this happens, the base colour that the self-adhesive layer had prior to printing becomes visible, which is undesirable when for example the label is made with a light coloured material, particularly paper, on which a background is printed using dark inks. In this case, a dark background is visible on the label surrounded by a light perimetric line, due to the sublimation of the ink along the perimeter of the label, which has interacted with the laser beam. The appearance of the label is consequently penalised.

A similar defect may be caused by the fact that the laser beam, particularly in the less central regions of the continuous ribbon of material, incises the printed surface along a direction that is not perpendicular to the thickness of the ribbon, but is oblique with respect to said thickness. Hence a cutting edge is generated that diverges passing from the printed surface of the self-adhesive layer, to the opposite surface to the printed one. This makes the colour of the material forming the label visible.

Another defect of known machines consists of the fact that, when the laser beam cuts the self-adhesive layer, the relative adhesive substance may melt and flow beyond the cut edge. This phenomenon, known as "overflow" of the adhesive substance, makes the edge of the label sticky, creating difficulties when the continuous ribbon bearing the labels, after being wound onto a reel and stored, needs to be unwound from the reel for the end use.

Furthermore, known machines may present some critical aspects in the event that some areas of the label have greater thicknesses than other areas of the label, for example, due to the application of high quantities of ink, which give rise to a very thick printed area. In this case, to cut the label without incising the support layer, it is necessary to calibrate the power of the laser source with great precision, increasing the power at the areas with greater thickness and reducing it at the areas with lower thickness. The control of the laser source is therefore rather complicated.

An example of prior art device is known from document WO02/14069. Such device does not solve the above technical problems.

An object of the invention is to improve the apparatuses and methods for manufacturing discrete portions, particularly labels adapted to be applied to respective items.

A further object is to provide an apparatus and a method that allow discrete portions to be obtained, such as labels, having a pleasant aesthetic appearance. In particular, an object is not to compromise the aesthetic appearance of the discrete portions at the respective edge areas.

Another object is to provide an apparatus and method for manufacturing discrete portions, such as labels, which can be easily checked, even when the discrete portions have some areas of greater thickness and other areas of lower thickness.

Another object is to provide an apparatus and method for manufacturing discrete portions, particularly labels which, if used for obtaining self-adhesive discrete portions starting from a material comprising a support layer to which a self-adhesive layer is coupled, does not damage the support layer when the self-adhesive layer is cut to manufacture discrete portions.

Another object is to provide a method for manufacturing discrete portions which, if used to obtain self-adhesive discrete portions intended to be wound onto a reel and stored before final use, does not present any difficulties when the self-adhesive discrete portions are unwound from the reel.

In a first aspect of the invention, an apparatus is envisaged for manufacturing discrete portions, comprising:
- an advancement device for advancing a flexible material along a path;
- a cutting device positioned along said path for cutting the flexible material so as to obtain a discrete portion, the cutting device comprising a laser source configured to emit a laser beam incident on a rear face, opposite a printed front face, of the flexible material;
- a retaining device for retaining the flexible material while the cutting device cuts the discrete portion from the flexible material.

Since the laser beam emitted by the laser source hits the rear face, i.e. the unprinted face, of the flexible material, the risk of damaging the printed face of the flexible material is significantly reduced while the latter is being cut. In particular, since the laser beam does not directly hit the printed face, it is almost impossible for the laser beam to heat the inks deposited on the printed face enough to cause their sublimation, hence making the base colour of the flexible material visible. This allows a discrete portion to be obtained, particularly a label, having a pleasant aesthetic appearance, in which—even if a dark background is printed on the discrete portion—the base colour of the flexible material is not visible as an anti-aesthetic light line arranged along the outline of the discrete portion.

Furthermore, by retaining the flexible material while cutting the discrete portion, it is possible to guarantee high cutting precision, also at high production speeds.

In one version, said path comprises a detachment zone for separating the flexible material from a support layer, the detachment zone being positioned upstream of the cutting device, so that the support layer does not interfere with the cutting device.

This version of the apparatus according to the first aspect of the invention allows a flexible material to be processed comprising a self-adhesive layer, so as to obtain self-adhesive discrete portions, particularly self-adhesive labels. In particular, thanks to the detachment zone in which the flexible material is separated from the support layer, it is possible to avoid damaging the support layer during the cutting operation. In fact, the discrete portions are cut from the flexible material after the latter has been detached from the support layer. Therefore, there is no risk of the cutting device being able to damage the support layer, since, during cutting, the support layer is separated from the flexible material and is positioned in an area away from the cutting device. The latter cannot therefore interact with the support layer.

Furthermore, by cutting the discrete portions from the flexible material while the latter is separate from the support layer, it is possible to use any areas with greater thickness than the discrete portion as a reference for the cutting operation, and to adjust the cutting device so that it can successfully cut such areas. Therefore, the cutting device will be able to successfully cut also areas with lower thickness than the discrete portion. This operating mode does not imply any risks of damaging the support layer while areas with lower thickness are being cut, since the support layer is not coupled to the flexible material during cutting.

Even when the cutting of the discrete portions takes place along a direction that is not perfectly perpendicular to the thickness of the self-adhesive layer, but oblique with respect to such thickness, a discrete portion is obtained delimited by an edge that diverges passing from the rear face of the flexible material (with which the cutting device interacts first) to the front face. Therefore, the colour of the material forming the flexible material is not made visible.

Since the support layer is detached from the flexible material at the time of cutting, the cutting methods may be chosen as preferred, without restrictions connected with the need not to damage the support layer. This allows cutting methods to be adopted that prevent the adhesive substance present on the flexible material from overflowing. In particular, it is possible to select the operating parameters of the laser source so that the cut is particularly fast, hence preventing the adhesive substance melting and flowing beyond the cut edge. Consequently, the discrete portions, if supported by a support layer wound onto a reel, may be easily unwound from the latter.

In a second aspect of the invention, a method is envisaged for manufacturing discrete portions, comprising the steps of:
- advancing a flexible material along a path, the flexible material having a front printed face and a rear face opposite the front printed face,
- affording a discrete portion by cutting the flexible material, by means of a laser beam incident on the rear face, a retaining device retaining the flexible material while the flexible material is cut.

The method envisaged by the second aspect of the invention allows the advantages to be obtained that were previously described with reference to the apparatus according to the first aspect of the invention.

The invention can be understood more fully and implemented with reference to the attached drawings, which illustrate some versions of its implementation by way of non-limiting example, of which:

Figure 1:
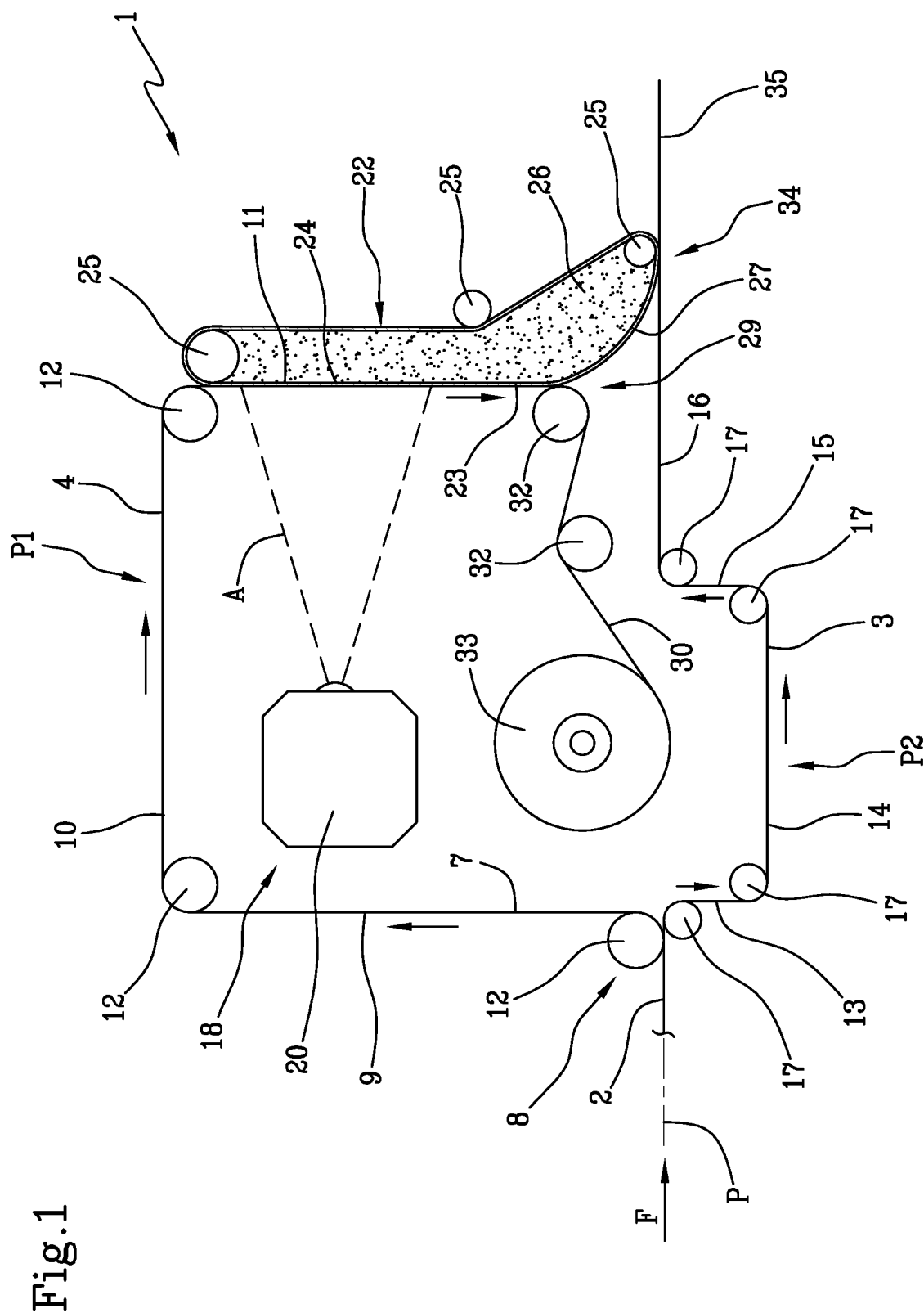
FIG. 1 is a schematic lateral view of an apparatus for manufacturing self-adhesive labels.

FIG. 1 shows an apparatus 1 for manufacturing labels 19, particularly of the self-adhesive type, starting from a multilayer material 2 in ribbon form. The labels 19 can be applied to items of various types, particularly to containers that can be used in the food or cosmetic sector or in other sectors. For example, the labels 19 can be applied to bottles of wine or other drinks, bottles of detergent, jars or tubs.

Figure 2:
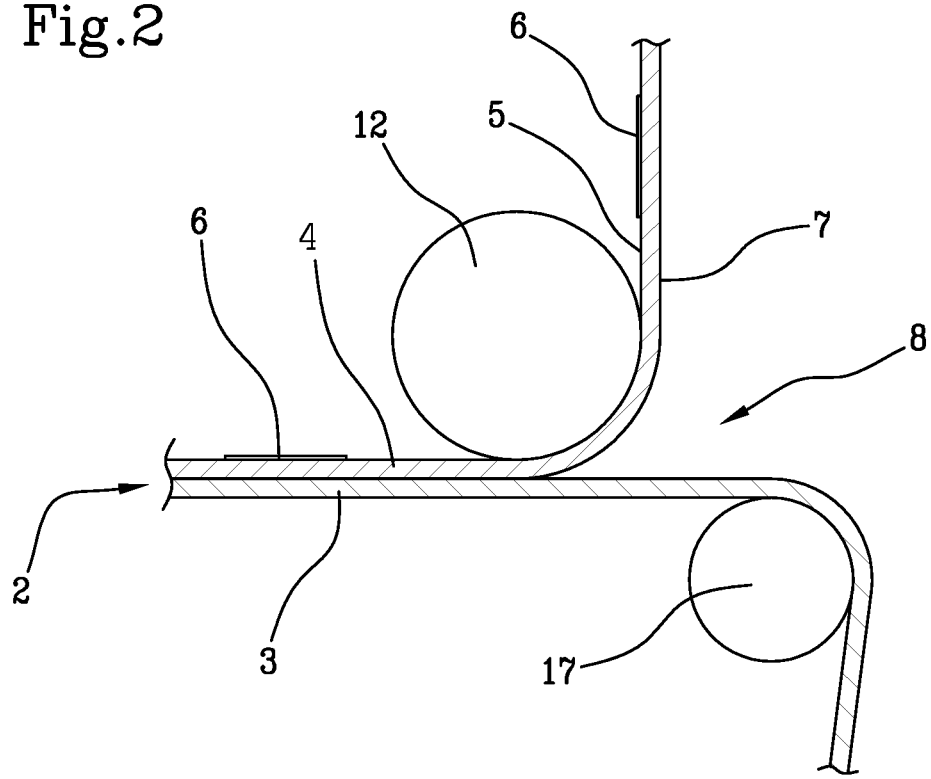
FIG. 2 is a schematic enlarged view, showing a detachment zone of the apparatus in FIG. 1.

As shown in FIG. 2, the multilayer material 2 comprises a support layer 3, to which a flexible material is removably coupled conformed like a self-adhesive layer 4.

In particular, the support layer 3 can be made with an oily paper material, or silicone-coated, or however surface treated so as to easily allow the detachment of the self-adhesive layer 4.

The self-adhesive layer 4 may be made of paper material, or polymeric, or the like.

The self-adhesive layer 4 is delimited by a front face 5, intended to remain visible when the label 19 formed starting from the multilayer material 2 is applied to the relative item. There may be one or more graphical patterns 6 on the front face 5, for example, inscriptions, logos, drawings or other decorative patterns, applied in particular through a printing process. The latter may be performed by a print unit arranged upstream of the apparatus 1.

The self-adhesive layer 4 is further delimited by a rear face 7, opposite the front face 5. On the rear face 7 an adhesive substance is applied that allows the self-adhesive layer 4, and therefore the label 19 from which it is to be afforded, to adhere to the item to which the label 19 is intended to be applied.

The rear face 7 is turned towards the support layer 3. When the multilayer material 2 enters the apparatus 1, the rear face 7 of the self-adhesive layer 4 is coupled to the support layer 3 through the adhesive substance mentioned above.

Advancement means are provided for advancing the multilayer material 2 into the apparatus 1, along an advancement direction F. In particular, the advancement means may be configured to advance the multilayer material 2 continuously, with a pre-fixed advancement speed. The multilayer material 2 lies on a plane surface P when it enters the apparatus 1.

The apparatus 1 comprises, in its inlet region, a detachment zone 8, shown in detail in FIG. 2. In the detachment zone 8, the self-adhesive layer 4 is detached from the support layer 3. In this way the rear face 7 of the self-adhesive layer 4 is no longer in contact with the support layer 3 and is made accessible for subsequent operations.

Downstream of the detachment zone 8, distinct paths are defined for the support layer 3 and for the self-adhesive layer 4 within the apparatus 1.

In particular, for the self-adhesive layer 4 a path P1 is defined, which may comprise in sequence an ascending section 9, a substantially horizontal section 10 and a descending section 11. The path P1 is defined at least partially by a plurality of rollers 12, onto which the self-adhesive layer 4 is wound. The rollers 12 may be equipped with a non-stick surface coating, particularly if intended to come into contact with the rear face 7, so as to prevent the self-adhesive layer 4 getting stuck to the rollers 12. The rollers 12 are included in an advancement device for advancing the self-adhesive layer 4 along the path P1 continuously.

For the support layer 3 instead, a further path P2 is defined, which, in the example shown, extends below the path P1 of the self-adhesive layer 4. In particular, the further path P2 may comprise in sequence a descending portion 13, a substantially horizontal portion 14 and an ascending portion 15. Downstream of the ascending portion 15, the further path P2 may comprise a final portion 16, in particular lying on the same plane P on which the multilayer material 2 lies when it enters the apparatus 1.

The further path P2 is defined by a plurality of roller elements 17, onto which the support layer 3 is wound.

In the detachment zone 8, a detachment element may be provided, shaped for example like a wedge not shown which is inserted between the self-adhesive layer 4 and the support layer 3 for facilitating its separation.

Alternatively, the self-adhesive layer 4 and the support layer 3 may be detached from one another manually, winding them respectively onto the rollers 12 and onto the roller elements 17, when the apparatus 1 starts to operate.

The apparatus 1 further comprises a cutting device 18 for cutting the self-adhesive layer 4 so as to obtain a label 19.

The cutting device 18 is positioned along the path P1 of the self-adhesive layer 4, so that it is facing the rear face 7 of the self-adhesive layer 4. In this way, during cutting, the cutting device 18 starts to interact with the rear face 7 of the self-adhesive layer 4 and proceeds along the thickness of the self-adhesive layer 4 until it reaches the front face 5.

In particular, the cutting device 18 is positioned in a defined space between the path P1 and the further path P2, so as to be surrounded by such paths.

Figure 3:
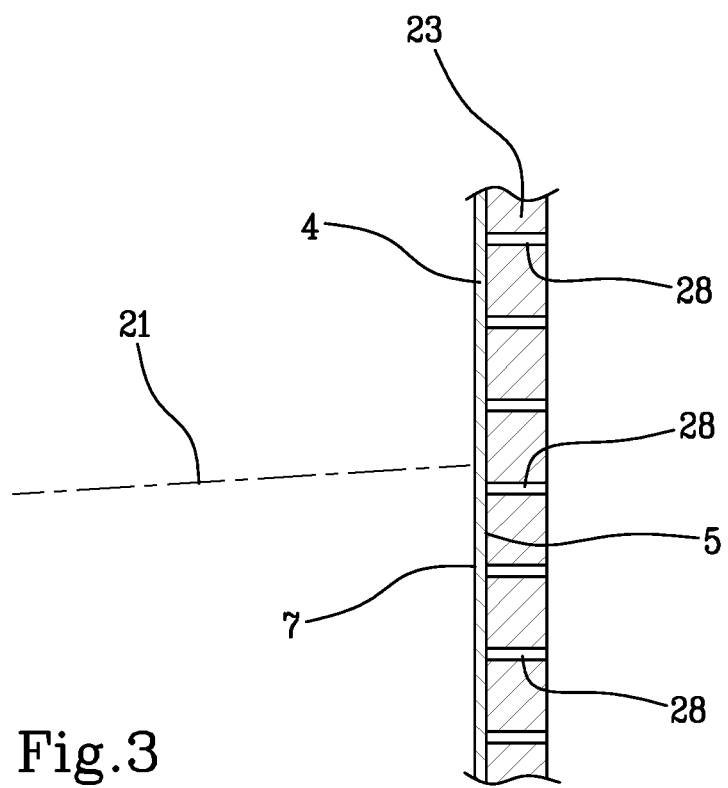
FIG. 3 is a schematic enlarged view, showing a cutting zone of the apparatus in FIG. 1.

The cutting device 18 may comprise a laser source 20, adapted to emit a laser beam 21, shown in FIG. 3, equipped with sufficient power to cut the self-adhesive layer 4. In particular, the laser source 20 is positioned so that the laser beam 21 emitted by it is incident on the rear face 7 of the self-adhesive layer 4.

The laser source 20 may comprise for example a $CO_2$ laser.

The cutting device 18 comprises a device of reflective elements not shown, for example mirrors, adapted to move the laser beam 21 into the scanning area A, whose outline is indicated by a broken line in FIG. 1. In this way, the laser beam 21 can move along a closed line defining a perimeter of the label 19, so as to separate the label 19 from the self-adhesive layer 4. Furthermore, the device of reflective elements allows the laser beam 21 to follow the self-adhesive layer 4 during cutting, so that the label 19 can be cut while the self-adhesive layer 4 moves along the path P1. This makes the apparatus 1 able to operate continuously, without stopping the self-adhesive layer 4 for separating the label 19 from it.

The apparatus 1 comprises a retaining device 22, adapted to retain in position the self-adhesive layer 4 during cutting. The retaining device 22 is arranged along the descending section 11. The retaining device 22 comprises, in the example shown, suction means acting on the front face 5 of the self-adhesive layer 4, i.e. on the face opposite the one onto which the laser beam 21 is directed. The retaining device 22 allows the self-adhesive layer 4 to advance continuously along the path P1, maintaining the self-adhesive layer 4 in a flat and extended configuration. In this way, the cutting device 18 can perform the cut with high quality, which would not be possible if the self-adhesive layer 4 underwent, along the descending section 11, undulations or deformations which would divert it from a planarity condition.

In the example shown, the retaining device 22 comprises a suction belt 23 movable along a closed path, which can be defined by a plurality of roller members 25. The path of the suction belt 23 has a branch 24 facing the path P1 of the self-adhesive layer 4, and in particular arranged parallel to the descending section 11. The branch 24 lies on a substantially vertical plane.

The suction belt 23 is motorised, so as to move in a synchronised way with the self-adhesive layer 4 along the portion of path in which they are facing one another, i.e. along the descending section 11.

The path of the suction belt 23 further has a conveying portion 27 arranged downstream of the branch 24 for conveying the already cut labels 19 towards an exit of the apparatus 1, as will be described in more detail below. The conveying portion 27 may have a curvilinear conformation.

The retaining device 22 comprises a suction chamber 26 within which a depression is created, for example, by means of a pump not shown. The retaining device 22 is conformed so that the suction chamber 26 is in fluid communication with the self-adhesive layer 4 and with the labels 19 respectively along the branch 24 and along the conveying portion 27. For that purpose, the suction chamber 26 is open towards the suction belt 23 along the branch 24 and along the conveying portion 27.

The suction belt 23 is delimited by a retaining surface adapted to retain the self-adhesive layer 4. The suction belt 23 has a perforated structure, i.e. it is equipped with a plurality of through holes 28, visible in FIG. 3, through which the depression inside the suction chamber 26 can act on the self-adhesive layer 4 or on the labels 19, keeping them in contact with the suction belt 23. Alternatively, the suction belt 23 may have a porous structure, so as to place anyway the suction chamber 26 in fluid communication with the surface of the suction belt 23 intended to interact with the self-adhesive layer 4 or with the labels 19.

Figure 5:
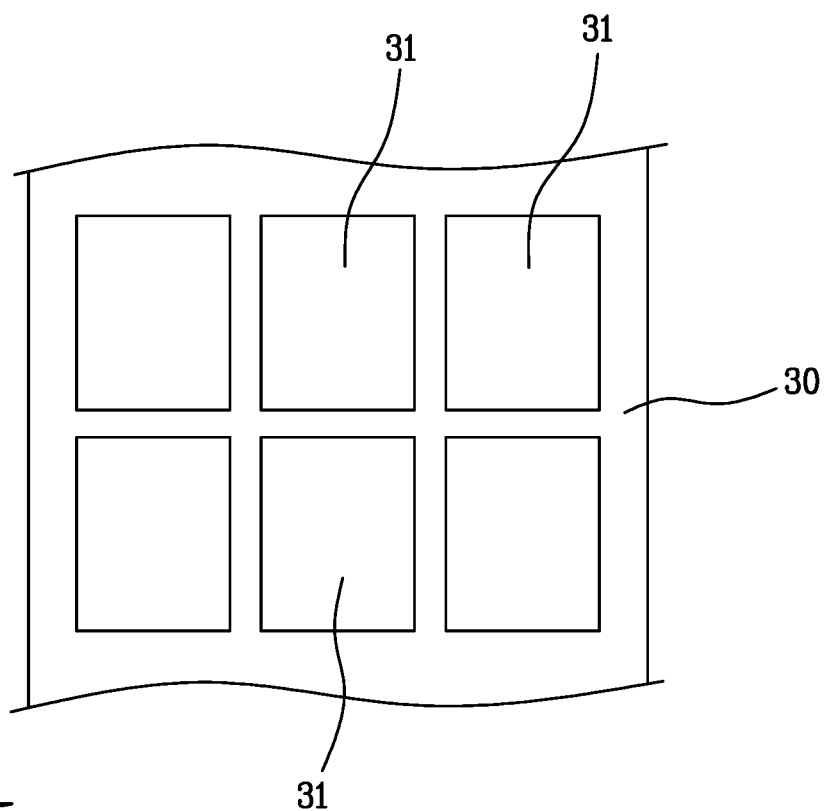
FIG. 5 is a front view, showing a portion of a flexible material from which a plurality of labels has been cut.

Downstream of the cutting device 18, the labels 19—which were cut by the cutting device 18 along a closed outline—are detached from the material surrounding the self-adhesive layer 4, which forms a waste material 30. As shown in FIG. 5, the waste material 30 is conformed like a ribbon, having the same width as the self-adhesive layer 4, in which there is a plurality of holes 31, each of which corresponds to a label 19.

It is therefore possible, in a separation zone 29 arranged downstream of the cutting device 18, to separate the waste material 30 from the labels 19.

In particular, in the separation zone 29, the waste material 30 is diverted along a recovery path, which may be identified by a plurality of revolving cylinders 32, until it is wound onto a reel 33. Advantageously, a shredding or grinding device (not shown as well known to the technical expert in the sector), may be provided for cutting or shredding the waste material 30 so as to reduce its bulk. This device may be arranged along the path followed by the waste material 30.

The labels 19 actually remain in contact with the suction belt 23 to be conveyed by the latter along the conveying portion 27.

Figure 4:
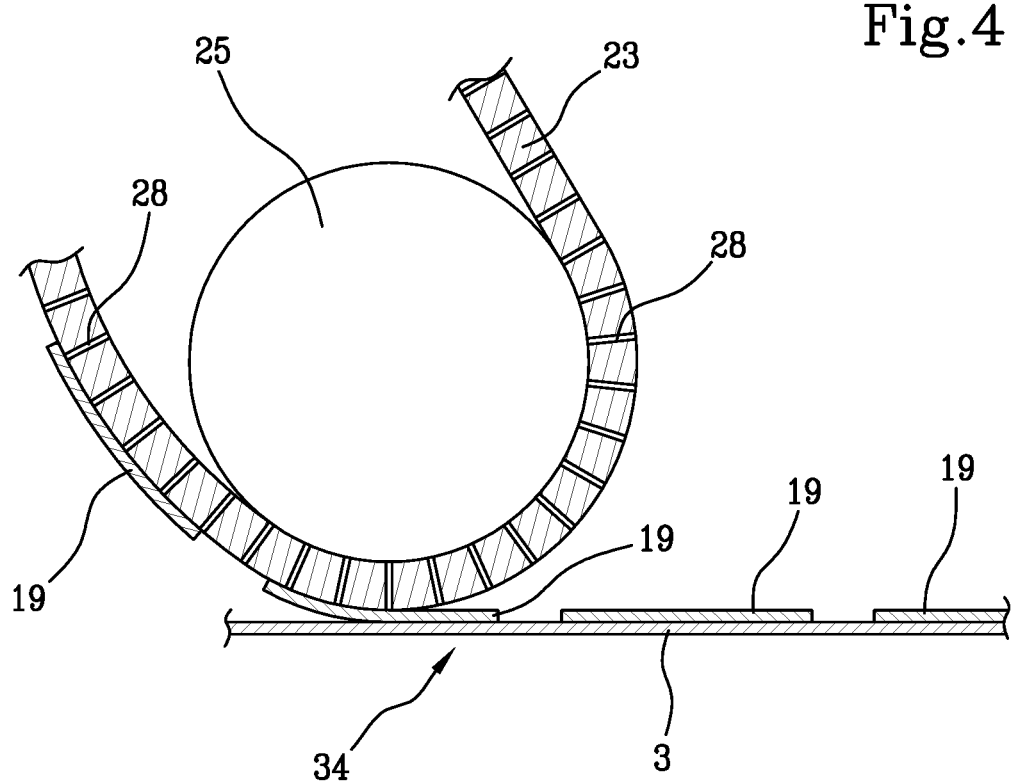
FIG. 4 is a schematic enlarged view, showing a coupling zone of the apparatus in FIG. 1.

As shown in FIGS. 1 and 4, downstream of the conveying portion 27 there may be a coupling zone 34 in which the labels 19 are positioned on a support surface which, in the example shown, delimits the support layer 3 from which the self-adhesive layer 4 was previously detached. For that purpose, the final portion 16 of the further path P2 along which the support layer 3 moves is arranged in proximity to a lower region of the suction belt 23, so that the support layer 3 can come into contact with the labels 19 advanced by the suction belt 23. In particular, in the coupling zone 34, the rear face 7—i.e. the face of the labels 19 furthest from the suction belt 23—comes into contact with the support layer 3. Since the rear face 7 is covered by an adhesive substance, the labels 19 remain coupled to the support layer 3. This can be facilitated by designing the suction chamber 26 so that the suction acting on the suction belt 23 is absent in the coupling zone 34. In this way the labels 19, which are no longer retained by the suction belt 23, remain attached to the support layer 3. In the embodiment in which the retaining device 22 envisages exercising an electrostatic force of attraction, the detachment of the labels 19 from the retaining belt 23 is further facilitated, since the electrostatic attraction may be reduced or cancelled in the desired zone to allow the adhesion of the labels 19 to the support ribbon 3.

In the coupling zone 34, the path followed by the conveying portion 27 has a variable curvature whose tangent is gradually less inclined with respect to the path followed by the support layer 3, along an advancement direction. In substance, proceeding along the advancement direction the conveying portion 27 assumes a decreasing inclination with respect to the support layer 3. Preferably, at least a section of the path of the conveying portion 27 is parallel to and overlapping the path of the support layer 3. In this way, the labels 19 overlap with the support layer 3 on a substantially parallel plane surface to the latter, and can therefore adhere perfectly to the support layer 3.

Advantageously, the coupling zone 34 is downstream of the separation zone 29, and is separated from it by the conveying portion 27. In other words, the coupling zone 34 is clearly distinguished from the separation zone 29 by means of the conveying portion 27 which has a length such as to allow the labels 19 to be completely separated from the waste material 30. The labels 19 move along the conveying portion 27 separate from the waste material 30 and isolated from one another. In this way, the labels 19 reach the coupling zone 34 separate from the waste material 30 and well isolated from one another. This allows firm and precise adhesion of the labels to the support layer 3.

Therefore, a material in ribbon form 35 exits from the apparatus 1 comprising the support layer 3, which is conformed like a continuous ribbon, to which the labels 19 are attached, already cut and conformed like discrete portions of self-adhesive material.

The material in ribbon form 35 may be subjected to subsequent processing on work units arranged downstream of the apparatus 1. For example, downstream of the apparatus 1 there may be a winding unit for winding the material in ribbon form 35 onto a reel, so as to obtain a reel of labels ready to be applied to the desired items.

Between the apparatus 1 and the winding unit a longitudinal cutting unit may be interposed, for cutting the material in ribbon form 35 longitudinally, so as to obtain two or more longitudinal strips each of which comprises just one row of labels 19.

During operation, after being processed by any work units arranged upstream of the apparatus 1 (such as printing units, painting units, units for making reliefs or the like) the multilayer material 2 enters the apparatus 1 and, in the detachment zone 8, undergoes a delamination, so that the self-adhesive layer 4 is detached from the support layer 3.

The self-adhesive layer 4 is moved, continuously, along the path P1, until it comes into the proximity of the cutting device 18. Here, the self-adhesive layer 4 interacts with the retaining device 22, and in particular adheres to the suction belt 23, which keeps it in an extended configuration, i.e. free from creases and undulations. The suction belt 23 moves at the same speed as the self-adhesive layer 4 along the path P1. The laser beam 21 generated by the cutting device 18 incises the rear face 7 of the self-adhesive layer 4, which is facing the cutting device 18, and penetrates progressively through the thickness of the self-adhesive layer 4, causing it to be cut.

The laser beam 21 is moved along a closed line corresponding to the perimeter of the label 19, following simultaneously the self-adhesive layer 4 which moves along the descending section 11, so as to cut the self-adhesive layer 4 to afford the label 19, while the self-adhesive layer 4 advances along the path P1.

After being cut, the label 19 remains adherent to the suction belt 23 due to the effect of the suction present in the suction chamber 26, while the waste material 30 surrounding the label 19 is wound onto the reel 33.

Subsequently, the path of the label 19 joins the further path P2 of the support layer 3, so that the label 19 is applied again onto the support layer 3. This happens both due to the effect of the adhesive substance on the face of the label 19 facing the support layer 3, and because the suction on the suction belt 23 is interrupted.

It is therefore possible to obtain labels 19 coupled to the support layer 3, ready to be applied to the desired items.

In a version not shown, the retaining device 22 may comprise, in place of the suction belt 23, different means able to retain the self-adhesive layer 4.

For example, the retaining device 22 may be of the electrostatic type, able to electrostatically charge the self-adhesive layer 4 to keep it in a desired position. In that case, the retaining device 22 comprises a continuous belt 23, i.e. free from holes or openings, and it is not necessary to provide means for producing suction of the self-adhesive layer. This implies a significant simplification of the device. To obtain the electrostatic attraction of the self-adhesive layer 4 it is possible to produce or transfer an electrostatic charge onto the self-adhesive layer 4, or onto the belt 23, or on both, in which case there are opposite electrostatic charges.

In any case, the apparatus 1 allows high quality labels 19 to be obtained in an automated way. In particular, the support layer 3 is not damaged by the laser beam 21 or more generally by the cutting device 18, since the support layer 3 is not physically present, i.e. it is separate from the self-adhesive layer 4, when the latter is cut.

Furthermore, the laser beam 21 interacts with the rear face 7 of the self-adhesive layer 4, without coming into contact directly with the front face 5.

This reduces the risks that any inks applied to the front face 5 sublime due to the high temperatures generated by the laser beam 21, thus making the underlying colour of the material composing the self-adhesive layer 4 visible.

Finally, the apparatus 1 allows high quality labels 19 to be obtained even when the labels 19 have areas of different thickness, e.g. areas of greater thickness in which a relief is present, obtained by depositing on the front face 5 a relatively high quantity of ink, and areas of lower thickness in which there are no reliefs. In this case, the cutting device 18 and in particular the relative laser source, can be calibrated so as to cut the areas of greater thickness—which automatically also allows the areas of lower thickness to be cut—without any risks of damaging the support layer 3 at the areas of lower thickness, since the support layer 3 is uncoupled from the self-adhesive layer 4 at the time of cutting.

Figure 6:
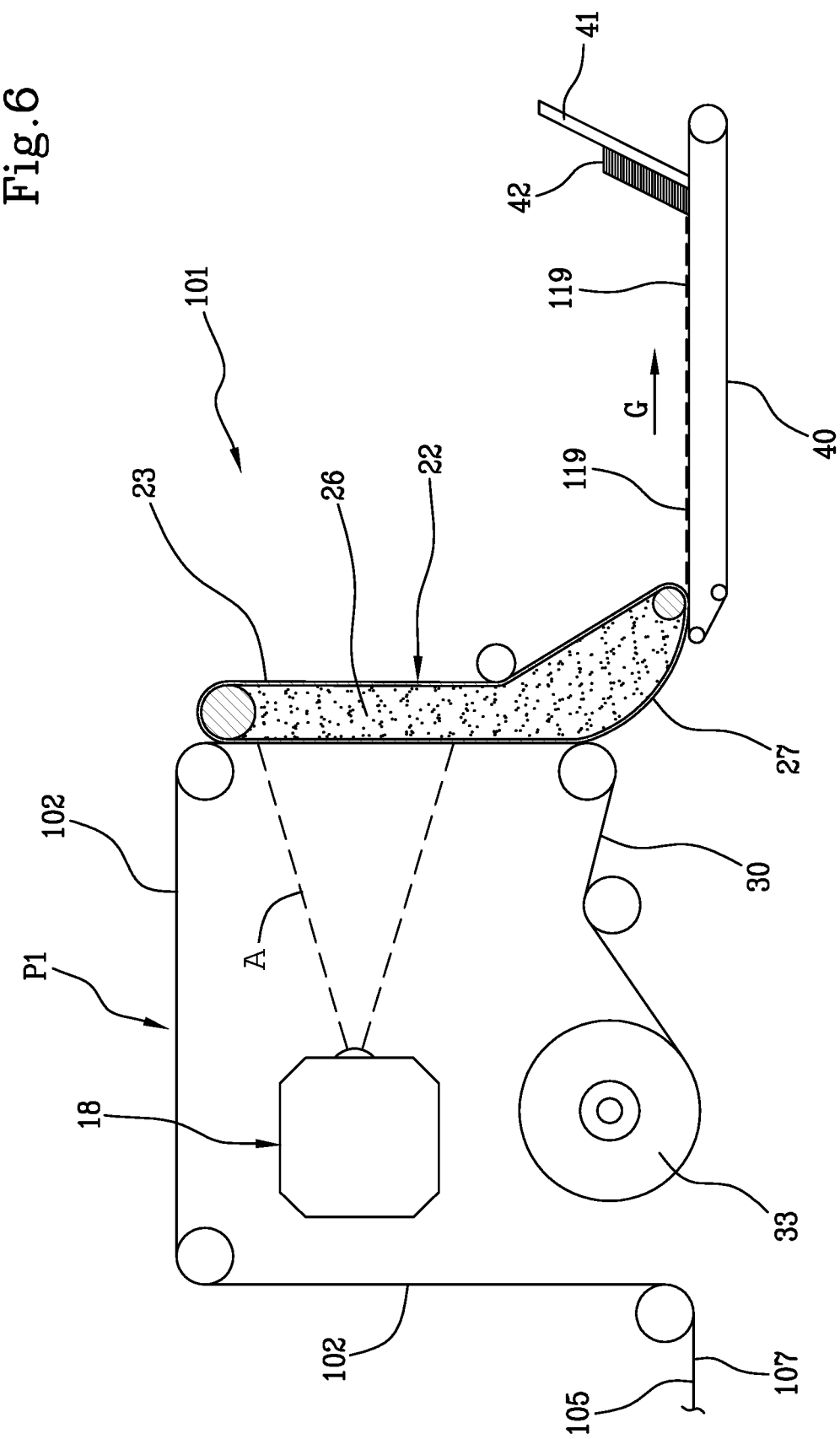
FIG. 6 is a view like the one in FIG. 1, showing an apparatus for manufacturing labels according to an alternative embodiment.

FIG. 6 shows an apparatus 101 for obtaining labels 119, according to an alternative embodiment. The parts of the apparatus 101 common to the apparatus 1 shall be indicated with the same reference numbers already used by describing FIGS. 1 to 5 and shall not be described again in detail.

The apparatus 101 is particularly suited to manufacturing labels 119 from a flexible material 102, having a single-layer structure, comprising for example a film of polymeric or paper material. The flexible material 102 may in particular be used for manufacturing labels intended to be positioned in a mould before a molten material is introduced into the mould to be shaped, according to a known technology such as "In Mould Labelling (IML)". The mould in which the label is positioned shall be subsequently used for moulding an item, to which the label shall remain firmly anchored.

Alternatively, the flexible material 102 may be used to form tubular heat-shrinkable labels, intended to be slipped onto bottles or other containers and then subjected to heat shrinking in order to adhere to the bottle or container.

The flexible material 102 is delimited by a front face 105, which may be printed, and by a rear face 107 opposite the front face 105.

Unlike the apparatus 1 shown in FIGS. 1 to 5, the apparatus 101 does not comprise a detachment zone, since the flexible material 102 does not include various layers to be detached from one another. The flexible material 102 which enters the apparatus 101 is then directly advanced along the path P1, so as to interact with the cutting device 18 while it is retained by the retaining device 22.

In particular, the cutting device 18 is arranged in a position turned towards the rear face 107 of the flexible material 102, so that the laser beam 21 is incident on the rear face 107, in order not to damage the front face 105, particularly in the event in which the latter is printed.

The cutting device 18 and the retaining device 22 are completely the same as those described with reference to FIGS. 1 to 5.

After the labels 119 have been cut by the cutting device 18, the waste material 30 is wound onto the reel 33. The labels 119 are conveyed by the suction belt 23 towards the exit of the apparatus 101, along the conveying portion 27.

However, the apparatus 101 does not comprise the coupling zone 34, since there is no need to couple the labels 119 to a support layer. Downstream of the suction belt 23, there is an exit conveyor 40, e.g. of the belt type, onto which the labels 119 are released from the suction belt 23, interrupting the suction provided on the latter.

The exit conveyor 40 conveys the labels 119 along an advancement direction G, taking them towards a stopping element 41, for example with an elongated shape. The labels 119 stop against the stopping element 41, forming a stack 42 of labels 119 which can be subsequently packaged into a relevant box, until the labels 119 are applied to the desired items. The stopping element 41 therefore acts as a stacking element for forming a stack 42 of labels 119.

The apparatus 101 allows labels 119 to be obtained having a pleasant aesthetic appearance, particularly because, by directing the laser beam 21 onto the rear face 107, the inks applied to the front face 105 are not damaged, even at the relative edge zone.

The apparatus 101 can be used not only to cut labels 119, but also to cut discrete portions of material intended for different uses, e.g. for cutting blanks made of card or cardboard intended to be subsequently folded for obtaining boxes or other packaging components.

The invention claimed is:

1. An apparatus for manufacturing discrete portions (19; 119), comprising:
   a first advancement device for advancing a flexible material (4; 102) along a first path (P1);
   a cutting device (18) positioned along said first path (P1) for cutting the flexible material (4; 102) so as to obtain discrete portions (19; 119) separated from waste material (30), the cutting device (18) comprising a laser source (20) so configured as to emit a laser beam (21) incident on a rear face (7; 107), the rear face (7; 107) being opposite a printed front face (5; 105) of the flexible material (4; 102);
   a retaining device (22) for retaining the flexible material (4; 102) while the cutting device (18) cuts the discrete portions (19; 119) from the flexible material (4; 102), which comprises a belt having a branch (24) facing the cutting device (18) and a conveying portion (27) arranged downstream of the branch (24), a separation zone (29) being interposed between the branch (24) and the conveying portion (27) for separating the waste material (30) from the discrete portions (19; 119), so that the conveying portion (27) conveys only the discrete portions (19; 119);
   a detachment zone (8) for separating the flexible material (4) from a support layer (3), the detachment zone (8) being positioned upstream of the cutting device (18), so that the support layer (3) does not interfere with the cutting device (18);
   a second advancement device for advancing the support layer (3) along a second path (P2) from the detachment zone (8) to a coupling zone (34) where the discrete portions (19, 119) are coupled to the support layer (3); characterised in that the coupling zone (34) is positioned downstream of the cutting device (18) and downstream of the separation zone (29), said coupling zone (34) being separated from the separation zone (29) by the conveying portion (27), wherein the conveying portion (27) of the belt holds the discrete portions (19; 119) and carries only the discrete portions (19; 119) from the separation zone (29) to the coupling zone (34), wherein the apparatus is constructed and configured such that, as a front portion of each discrete portion (19; 119) first contacts the support layer (3) at the coupling zone (34), said front portion simultaneously contacts the belt.

2. An apparatus according to claim 1, wherein the cutting device (18) comprises an arrangement of reflective elements for moving the laser beam (21), so that the laser beam (21) moves along a line defining a perimeter of the discrete portion (19; 119) and simultaneously follows the flexible material (4; 102) in order to cut the flexible material (4; 102) while the flexible material (4; 102) moves forward along said first path (P1).

3. An apparatus according to claim 1, wherein the retaining device (22) is configured to retain the flexible material (4; 102) by means of an electrostatic force of attraction.

4. An apparatus according to claim 1 wherein the retaining device (22) comprises a suction belt (23) for sucking the flexible material (4; 102), so that the flexible material (4; 102) is retained in contact with a retaining surface delimiting the suction belt (23).

5. An apparatus according to claim 4, wherein the retaining surface lies on a substantially vertical plane.

6. An apparatus according to claim 4, wherein the suction belt (23) is movable synchronously with said first advancement device, so that the flexible material (4; 102) is retained while the flexible material (4; 102) advances along a part of said first path (P1).

7. An apparatus according to claim 1, wherein the coupling zone (34) is distinguished from the separation zone (29) by means of the conveying portion (27) which has a length such as to allow the discrete portions (19) to be completely separated from the waste material (30).

8. The apparatus according to claim 1, wherein the branch (24) of the belt retains the flexible material (4; 102) while the cutting device (18) cuts the discrete portion (19; 119) from the flexible material (4; 102).

9. The apparatus according to claim 1, wherein the belt retains the flexible material (4; 102) continuously while the cutting device (18) cuts the discrete portions (19; 119) from the flexible material (4; 102) and until the waste material (30) is separated from the discrete portions (19; 119), and wherein the belt continuously retains the discrete portions (19; 119) from when the discrete portions (19; 119) are cut from the flexible material (4; 102) until the discrete portions (19; 119) are coupled at the coupling zone (34) to the support layer (3).

10. The apparatus according to claim 1, wherein the belt retains the flexible material (4; 102) via electrostatic force of attraction.

11. The apparatus according to claim 1, wherein, as each discrete portion (19; 119) contacts the support layer (3) at the coupling zone (34), it simultaneously contacts the belt.

12. The apparatus according to claim 1, wherein, as each portion of each discrete portion (19; 119) contacts the support layer (3) at the coupling zone (34), said each portion simultaneously contacts the belt.

13. The apparatus according to claim 1, wherein the support layer (3) moves continuously from the detachment zone (8) to and through the coupling zone (34).

14. The apparatus according to claim 1, wherein the belt is curved at the location where said front portion simultaneously contacts the belt.

* * * * *